Jan. 26, 1932.    E. B. LE MARE    1,843,033
MEANS FOR FEEDING MOLTEN GLASS TO ROLLING APPARATUS
FOR PRODUCING CONTINUOUS GLASS STRIPS
Filed Dec. 18, 1930

Inventor.
E. B. Le Mare
By Morrison, Kennedy & Campbell
Attys.

Patented Jan. 26, 1932

1,843,033

UNITED STATES PATENT OFFICE

ERNEST BRISTOW LE MARE, OF ST. HELENS, ENGLAND, ASSIGNOR TO PILKINGTON BROTHERS LIMITED, OF LIVERPOOL, ENGLAND, A COMPANY OF ENGLAND

MEANS FOR FEEDING MOLTEN GLASS TO ROLLING APPARATUS FOR PRODUCING CONTINUOUS GLASS STRIPS

Application filed December 18, 1930, Serial No. 503,196, and in Great Britain December 28, 1929.

This invention relates to apparatus for use in connection with the continuous production of glass in strip form by rolling molten metal issuing from a tank or other source, and is particularly directed to improvements in the means employed for controlling and regulating the rate of flow.

In connection with apparatus of this kind, it is customary to regulate the flow of glass from the tank by means of a fire-clay gate adapted to slide up and down in grooves or against shoulders formed in the walls of the conduit leading from the tank.

According to this invention, the conduit is made wholly and partly with sides inclined towards one another in the direction of flow of the glass, and without any groove or recess, and the gate engages these inclined sides, its edges being correspondingly inclined.

Figure 1:
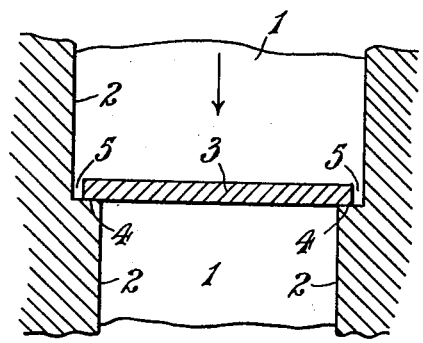
Figure 2:
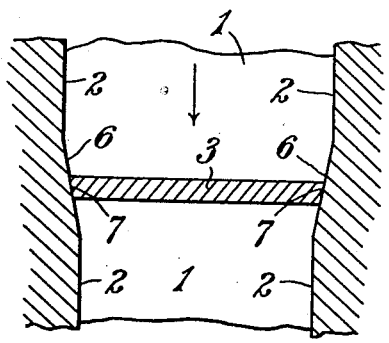

In the accompanying drawings, Figure 1 is a horizontal section showing a conduit and gate as customarily made, and Figure 2 is a similar view showing a conduit and gate made according to this invention.

Like reference numerals indicate like parts in both of the figures.

1 is the conduit along which glass flows in the direction of the arrow from the tank, 2 are its side-walls and 3 the gate. Referring to Figure 1, recesses are customarily made in the side walls 2 forming shoulders 4 against which the gate 3 bears.

With this construction it is found that glass in the spaces 5, where it has only small contact with the main body of glass, becomes chilled and, especially when the gate is moved, portions of the chilled glass near the lower edge of the gate break away and enter the stream of glass, producing defects in the product.

If, however, the spaces 5 be reduced to the minimum possible, so as to diminish the quantity of chilled glass, the gate becomes sealed in the recess and portions thereof are liable to break when the gate is moved.

Referring to Figure 2, which shows a conduit and gate constructed according to this invention, the conduit 1 is formed with continuous side walls without grooves or recesses in which glass can become chilled. Over at least a portion of their length, the side walls 2 of the conduit 1 are inclined as at 6, and the gate 3, with correspondingly inclined edges 7, engages the inclined walls 6 to close the conduit, without the formation of any recess in which glass can become chilled.

This construction has the further advantage that the gate, when, as frequently occurs, it becomes distorted, closed the conduit more effectively than would be the case with a gate engaging parallel surfaces as in Figure 1.

Having described my invention, I declare that what I claim and desire to secure by Letters Patent is:—

1. In apparatus for feeding molten glass from a source of supply to a rolling apparatus, a gate for controlling the flow of molten glass along a conduit, having at its opposite vertical edges surfaces which are inclined to the direction of flow of the glass and converge forwardly.

2. In apparatus for feeding molten glass from a source of supply to a rolling apparatus, the combination with a conduit for the molten glass having side walls which for at least a portion of their length are inclined towards one another in the direction of flow of the glass, of a gate for controlling the flow of the glass along the conduit having inclined edges adapted to engage the said inclined walls.

In witness whereof I have affixed my signature hereto.

ERNEST BRISTOW LE MARE.